United States Patent

Engelking et al.

[15] 3,695,641
[45] Oct. 3, 1972

[54] TUBE FITTING HAVING TAPERED ACCESS OPENING AND CLOSURE PLUG

[72] Inventors: Frederick S. Engelking; Calvin D. Loyd, both of Peoria, Ill.

[73] Assignee: Caterpillar Tractor Co., Peoria, Ill.

[22] Filed: Sept. 2, 1970

[21] Appl. No.: 69,029

[52] U.S. Cl. ............... 285/121, 285/332.1, 285/156, 285/382.4, 138/90
[51] Int. Cl. .............................................. F16l 55/12
[58] Field of Search...285/121, 127, 107, 332.1, 332, 285/179, 382.4, 382.5, 156, 158, 15, 190; 29/523, 525

[56] References Cited

UNITED STATES PATENTS

| | | |
|---|---|---|
| 1,159,950 | 11/1915 | Kelly ........................... 138/90 |
| 3,534,988 | 10/1970 | Lindsey .............. 285/382.4 X |
| 868,936 | 10/1907 | McGinn ..................... 138/90 |
| 3,511,254 | 5/1970 | Dyer et al. ............... 138/89 X |
| 1,997,878 | 4/1935 | Wagner ................ 138/89 UX |
| 3,420,259 | 1/1969 | Dargitz .................... 138/89 X |
| 3,471,179 | 10/1969 | Sixt .......................... 138/89 X |

*Primary Examiner*—David J. Williamowsky
*Assistant Examiner*—Wayne L. Shedd
*Attorney*—Fryer, Tjensvold, Feix, Phillips & Lempio

[57] ABSTRACT

In an elbow fitting for receiving an expandible tube, an access opening is provided to permit internal access to the tube opening for an expander tool, the access opening having an outwardly converging, tapered bore with a tapered plug being arranged in the access opening after the tube is secured within the tube opening in order to seal the fitting.

6 Claims, 7 Drawing Figures

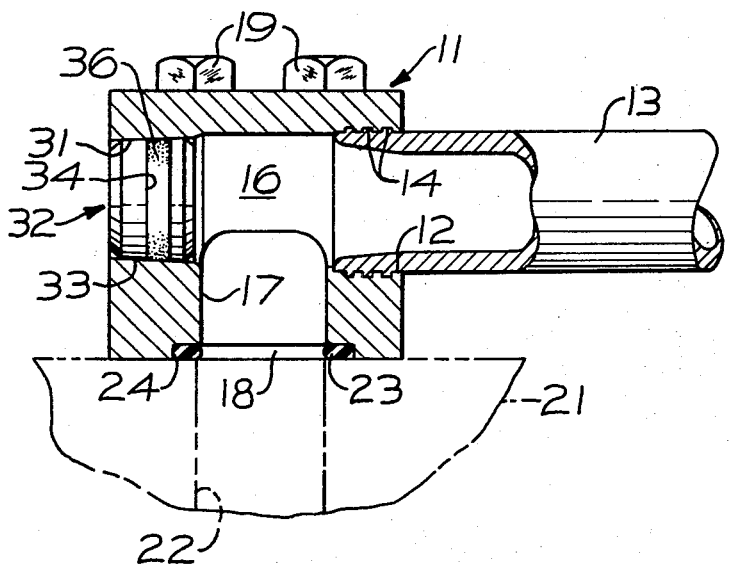
Fig-1-
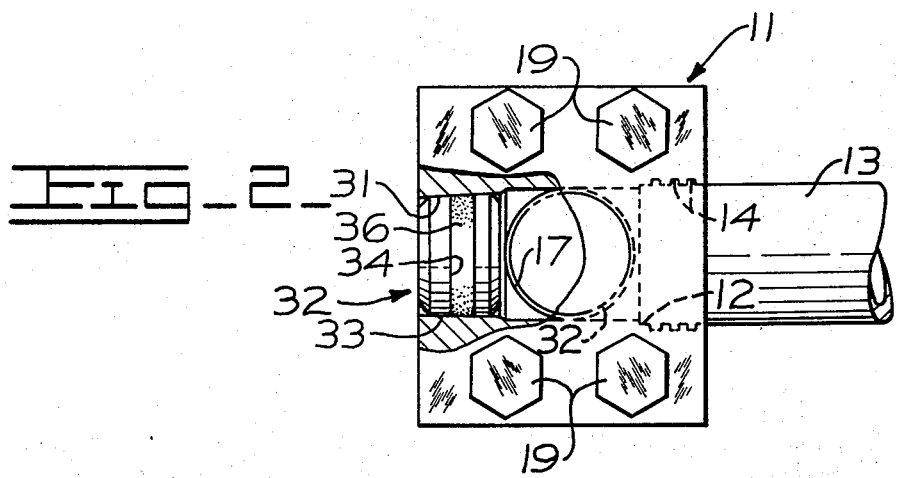
Fig-2-
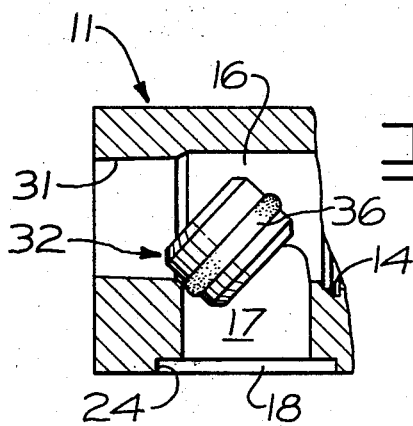
Fig-3-
INVENTORS
FREDERICK S. ENGELKING
CALVIN D. LOYD
BY
Fryer, Tjensvold, Feix, Phillips & Lempio
ATTORNEYS

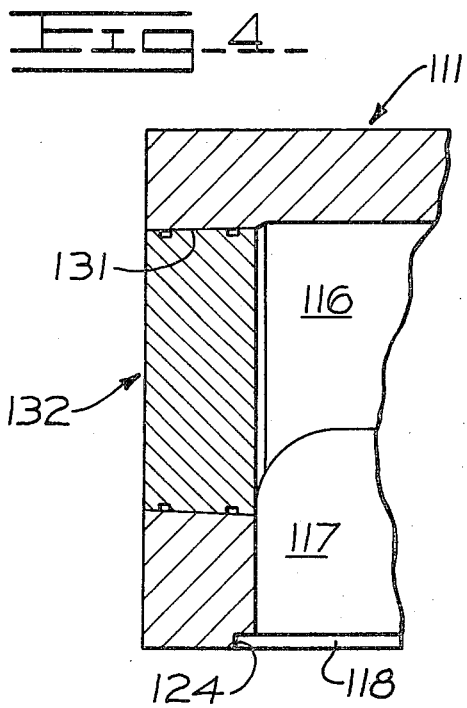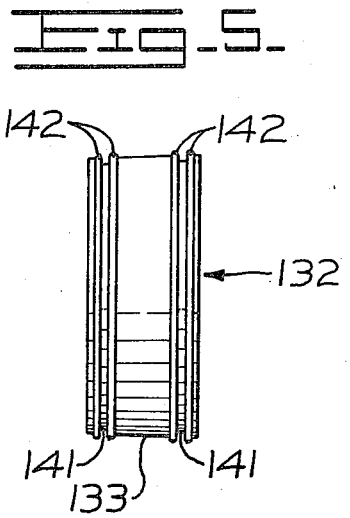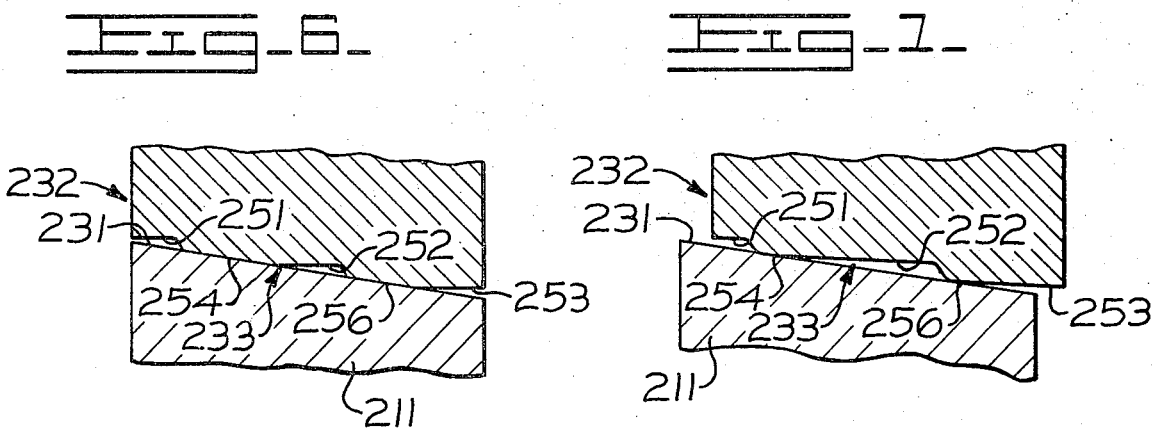

TUBE FITTING HAVING TAPERED ACCESS OPENING AND CLOSURE PLUG

The present invention relates to tube fittings and more particularly to an elbow fitting having an opening to which a tube may be secured. In order to permit internal access to the tube opening through the elbow fitting, an access opening is provided. Closure means for rapidly and effectively sealing the access opening is provided in the form of a tapered plug generally conforming with an outwardly converging, tapered bore of the access opening, the interior of the fitting being formed to permit insertion of the plug into the access opening after the tube is secured to the fitting.

The access opening is preferably formed generally in line with the tube opening in order to readily permit internal access to the tube opening. Such an arrangement may be particularly adapted for tube fittings wherein the tube is expanded into sealed relation with the tube opening in the fitting. Such openings have been employed in similar elbow fittings in the past to serve for example as a pressure tap. However, these openings were generally not contemplated or designed for permitting an expander tool to penetrate the fitting interior. The problem of effectively sealing the access opening after completing the bond between the tube and the fitting is of particular concern where the tube fitting must necessarily contain high fluid pressure. Other methods for closing the access opening, such as welding or external insertion of a threaded plug have generally been found inadequate particularly under such high pressure conditions.

Generally, closure means for the access opening are highly susceptible to leakage. Also, the insertion of the closure plug into the access opening may tend to damage the seal or bond between the fitting and the tube. For example, the heat generated by welding or the torque developed during insertion of a threaded plug may tend to damage an expanded bond between the fitting and a tube. A tube fitting constructed according to the present invention has been found to be a particularly effective and relatively simple solution for achieving a fluid seal within such an access opening.

Accordingly, it is an object of the present invention to provide a tube fitting having an access opening wherein the access opening is closed by a tapered plug generally mating with an outwardly converging, tapered bore forming the access opening.

It is a further object of the invention to provide means for effectively securing the plug within the access opening and providing a seal therebetween.

Additional objects and advantages of the present invention are made apparent in the following description having reference to the accompanying drawings.

In the drawings:

FIG. 1 is a side view, with parts in section, of a tube fitting constructed according to the present invention;

FIG. 2 is a top view of the same fitting;

FIG. 3 is a fragmentary view similar to FIG. 1 and more clearly illustrating internal sizing of the fitting;

FIG. 4 is a fragmentary, sectioned view similar to FIG. 1 and illustrating another embodiment of the present invention;

FIG. 5 is a side view of the plug prior to insertion within the fitting as illustrated in FIG. 4;

FIG. 6 is a fragmentary sectioned view showing another configuration for the plug; and FIG. 7 is a view similar to FIG. 6 while more clearly illustrating configuration of the plug prior to its insertion within a tapered opening.

Referring now to FIG. 1, an assembly representing a preferred embodiment of the present invention includes an elbow or tube fitting 11 having a tube opening 12 within which one end of a tube 13 is expanded to form a hermetically sealed bond with the fitting 11. As shown in FIG. 1, the opening 12 is formed with a number of grooves 14 into which the tube is expanded to more firmly secure the tube in place relative to the fitting and to assure a better seal therebetween.

The fitting or housing 11 also defines a chamber 16 formed inwardly of the opening 12 and a cross-cut passage 17 which is in communication with the opening 12 by means of the chamber 16. The passage 17 is in communication with another opening 18 to provide fluid communication across the fitting. The fitting is secured by means of bolts 19 to a hydraulic component 21 having a fluid passage 22 which is in fluid communication with the tube 13 by means of the fitting 11. A flexible O-ring 23 is arranged within a groove 24 about the opening 18 to prevent leakage across the interface between the fitting 11 and the component 21.

In order to properly expand the tube 13 within the opening 12, it is desirable to provide internal access for an expander tool (not shown) to the opening 12 through the chamber 16 of the fitting. Such access is permitted by another opening or bore 31 formed by the fitting for in-line communication with the opening 12 by means of the chamber 16.

After an expander tool has been inserted through the access opening 31 to expand the tube 13 within the opening 12 in an otherwise conventional manner, a plug 32 is arranged within the opening 31 to hermetically seal the fitting. As may be best seen in FIG. 1, the bore 31 if formed with an outwardly converging taper and the plug 32 has a generally mating tapered surface 33. To improve the seal between the plug and the tapered bore 31, a groove 34 is formed circumferentially about the tapered surface 33 of the plug with a flexible O-ring 36 (See FIG. 3) being arranged in the groove. When the fitting is employed within a high pressure hydraulic circuit, the plug 32 may be merely placed within the tapered bore 31, high fluid pressure within the chamber 16 being sufficient to positively seat the plug and provide a good hermetic seal by means of the O-ring 36.

The chamber 16 is sized to permit insertion of the plug 32 into the opening 31 from the interior of the fixture 11. Preferably, both the chamber 16 and the passage 17 are sized so that the plug 32 may enter the chamber 16 through the opening 18 and the passage 17 and then be inserted into the access opening 31 in a manner more clearly seen with reference to FIGS. 2 and 3. The plug is shown in phantom at 32' in FIG. 2 to illustrate its clearance with respect to the passage 17. In FIG. 3, the plug 32 is shown in a position within the chamber 16 just prior to being inserted within the access opening 31.

Preferably, the angle of taper for the bore 31 is sufficiently small to permit positive seating of the plug while still preventing the plug from passing outwardly through the access opening particularly when high fluid pressures exist within the fitting 11.

Tests conducted upon a fitting constructed in the manner described above have evidenced its ability to successfully contain fluid pressures as high as 6,500 psi throughout 300,000 pressure cycles. It was also determined that once the plug is seated within the access opening, a substantial force, for example, 7,000 pounds minimum, may be required to force the plug inwardly toward the chamber 16. Accordingly, the manner in which the plug is seated within the access opening tends to prevent it from being accidentally forced out of the opening 31.

Another embodiment of the invention is illustrated in FIGS. 4 and 5 including a similar fitting or housing 111 with an access opening 131 similar to that indicated at 31 in FIGS. 1-3. The housing is also formed with a similar chamber 116, a passage 117, an opening 118 and an O-ring groove 124. However, the plug 132 includes different means by which it is seated and sealed within the opening 131. The plug 132 has a similar tapered surface 133. A pair of grooves 141 are formed in spaced apart relation about the surface 133 for example by rolling or coining, so that outwardly projecting ridges 142 of deformable material extend beyond the tapered surface 133 on opposite sides of each groove 141. As the plug 132 is forced outwardly into the access opening, the ridges 142 are extruded into intimate contact with the tapered bore 131 to provide a positive seal between the plug and the fitting.

In FIGS. 6 and 7, yet another embodiment 232 of the plug is partially indicated within a fragmentary portion 211 of a similar elbow fitting which also has an outwardly converging, tapered bore indicated at 231. The plug is illustrated in FIG. 7 as it is being initially inserted within the tapered bore 231. As best shown by that figure, the tapered surface 233 of the plug 232 comprises a plurality of stepped surfaces 251, 252, 253 forming a pair of deformable ridges 254 and 256 which are also extruded into intimate contact with the tapered bore 231 when the plug is seated thereagainst as illustrated in FIG. 6.

What is claimed is:

1. A fitting for expansible sealing engagement with a tubular member and bolt sealing engagement with a second member comprising:
   a. a passage through said fitting having a tube receiving end and a smooth, outwardly tapered plug receiving end;
   b. a third lateral opening, the axis of which intersects the axis of said passage and which opening terminates in an external sealing face, the diameter of said plug receiving end being smaller than the diameter of said lateral opening;
   c. bolt means through said fitting to seal said face to said second member; and
   d. an unthreaded tapered plug having sealing means of a diameter less than the diameter of said third opening and of sufficient diameter to seat and seal in said plug receiving end upon pressure application thereto.

2. The fitting of claim 1 wherein the tube opening is formed as a cylindrical bore having axially spaced apart grooves into which a tube is expanded.

3. The fitting of claim 1 wherein the plug has a groove circumferentially formed in its tapered surface, a flexible O-ring being arranged in the groove to provide a hermetic seal with the tapered bore.

4. The fitting of claim 1 wherein at least a circumferential portion of the tapered plug surface is deformable for intimately mating with the tapered bore to secure the plug within the access opening.

5. The fitting of claim 1 wherein the tapered plug surface has a plurality of circumferentially arranged, axially spaced apart, deformable ridges for intimately mating with the tapered bore.

6. The fitting of claim 1 wherein the deformable ridges comprise a plurality of stepped surface portions.

* * * * *